United States Patent [19]

Neubert

[11] Patent Number: 4,902,201
[45] Date of Patent: Feb. 20, 1990

[54] RUPTURE PROTECTION RING FOR AN ENGINE CASING

[75] Inventor: Horst Neubert, Unterhaching, Fed. Rep. of Germany

[73] Assignee: MTU Motoren-und Turbinen Union Muenchen GmbH, Munich, Fed. Rep. of Germany

[21] Appl. No.: 343,166

[22] Filed: Apr. 25, 1989

[30] Foreign Application Priority Data

May 3, 1988 [DE] Fed. Rep. of Germany ....... 3814954

[51] Int. Cl.⁴ .............................................. F01D 25/24
[52] U.S. Cl. ......................................... 415/197; 415/9; 138/110; 181/204; 156/189
[58] Field of Search .............. 415/9, 173.4, 197, 119, 415/121 G, 219 R; 416/190; 156/185, 189, 190, 191, 180; 181/202, 204, 243; 220/3, 58, 71, 72; 138/110, 172, 174, 109, 125; 428/377

[56] References Cited

U.S. PATENT DOCUMENTS

| | | | |
|---|---|---|---|
| 4,397,608 | 8/1983 | Husain et al. | 415/9 |
| 4,452,563 | 6/1984 | Belanger et al. | 415/9 |
| 4,452,565 | 6/1984 | Monhardt et al. | 415/9 |
| 4,490,092 | 12/1984 | Premont | 415/9 |
| 4,547,122 | 10/1985 | Leech | 415/9 |
| 4,818,176 | 4/1989 | Huether et al. | 415/9 |

FOREIGN PATENT DOCUMENTS

| | | |
|---|---|---|
| 2950752 | 6/1980 | Fed. Rep. of Germany . |
| 3515835 | 12/1985 | Fed. Rep. of Germany . |
| 2514823 | 4/1983 | France . |

Primary Examiner—Robert E. Garrett
Assistant Examiner—Hoang Nguyen
Attorney, Agent, or Firm—W. G. Fasse; D. H. Kane, Jr.

[57] ABSTRACT

A rupture prevention ring consists of two coaxially arranged, spaced-apart stiff end rings wrapped in several layers of fiber cloth. Resin bonding is used around the end rings while in the intermediate area between the end rings, the fibers are not free of resin and hence not stiffened. Owing to the high energy absorption capability of the structure including the elastic yielding of the fibers without the resin, an excellent containment ability is obtained at a low weight. Fragments are effectively retained without jeopardizing the rotating blade and disk assembly of the damaged stage.

15 Claims, 3 Drawing Sheets

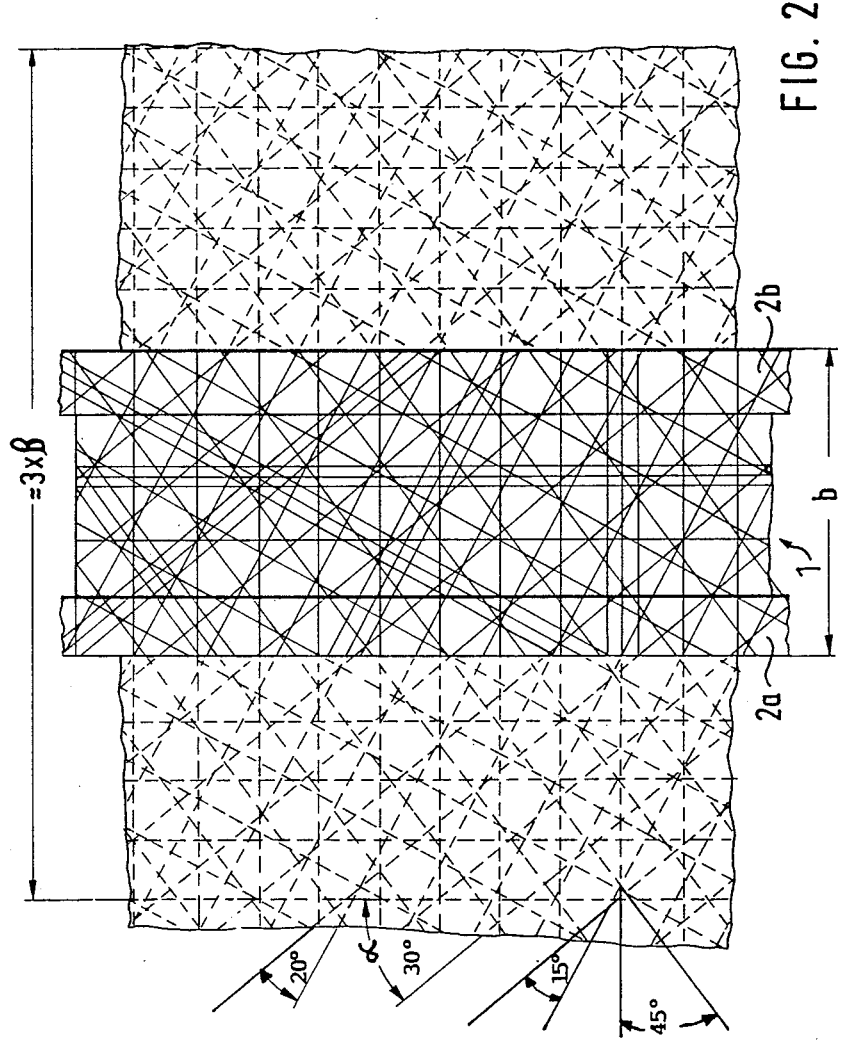

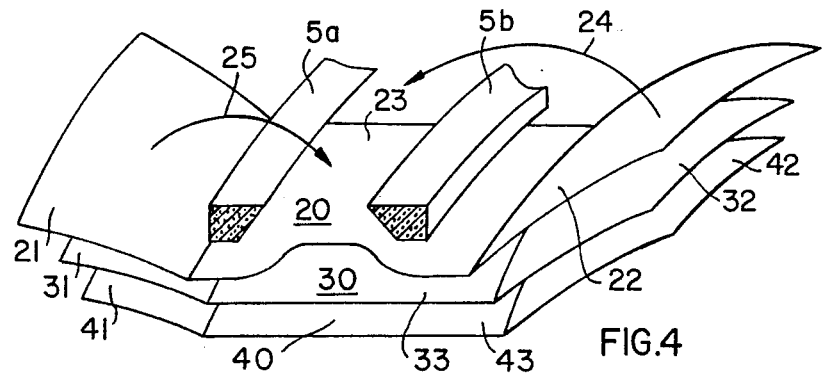
FIG.4
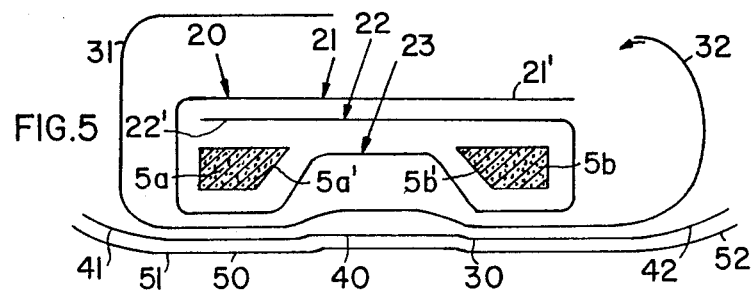
FIG.5
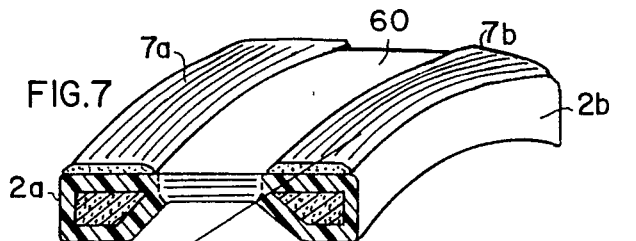
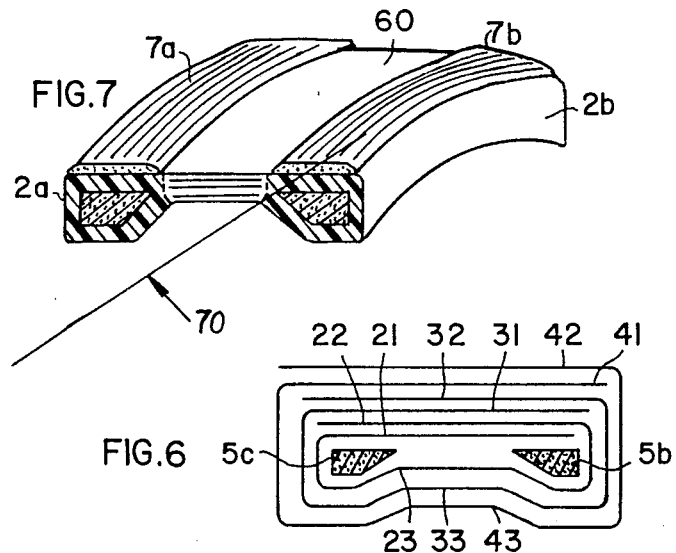
FIG.7
FIG.6

RUPTURE PROTECTION RING FOR AN ENGINE CASING

FIELD OF THE INVENTION

This invention relates to a rupture protection ring for an engine casing. Such a protection ring is at least partially made of fiber compound or fiber composite materials.

BACKGROUND INFORMATION

In the operation of turbo engines there is the danger that the impingement of foreign bodies on the blades, or due to material fatigue, will sever fragments from the rapidly spinning rotor, thereby causing such fragments to fly off by centrifugal force. Considering the prevailing operating conditions of aero engines, weight considerations forbid thickening the walls in the endangered area sufficiently to safely keep a fragment from penetrating the wall of the engine casing. However, penetration must in any event be prevented, since in the case of aircraft, fragments penetrating the engine casing may produce severe damage, injur persons or damage important parts and so cause crashes.

For this reason, it has been the practice to fit rupture protection rings of lightweight, high tensile strength materials around the engine casing in the endangered areas to safely contain fragments. Suitable materials for such rupture protection rings notably are fiber-reinforced materials wrapped around the engine casing in the form of rovings or fibercloth. German Patent Publications DE-OS 2,950,752 and DE-OS 3,515,835 illustrate such rupture protection rings, where cloth layers of aramid fibers are wrapped in several layers which are interwoven. These constructions have the disadvantage that the highly elastic fibers are heavily expanded by an impact so that engine parts in close proximity to the engine casing may still be injured even if the fragment is contained. A great degree of expansion is nevertheless needed to produce stretch in the highly elastic fiber for maximizing its fragment containing or retaining action.

Another disadvantage afflicting conventional structures of this kind is seen in that the fibers—with their free ends at the edge of the rupture protection ring—are unable to transfer forces, whereby the volume available for energy absorption is reduced. Another disadvantage is seen in that a blade exiting near the ring edge will bend the edge up and slide over it. To prevent this, the rupture protection ring must be made much wider than is conventionally feasible—at a considerable weight penalty. French Patent Publication (FR-PS) 2,514,823 discloses a generic version with one or more rigid rings enveloping the engine casing, wherein the rings are attached to a shield-like section made of laminated fibercloth. This arrangement has the disadvantage that owing to the high shear load on the laminate, the energy absorption of the structure is rather low in relation to the fiber strength. The laminate is additionally disadvantaged by its high weight.

OBJECTS OF THE INVENTION

In view of the foregoing it is the aim of the invention to achieve the following objects singly or in combination:

to improve a generic rupture protection ring in such a way that high energy absorption results are obtained simultaneously with a moderate radial expansion;

to construct the ring in such a way that its weight is reduced for an optimal exploitation of especially the high strength offered by fiber materials; and to widen such rings in the axial direction of the respective casing without proportionally increasing the weight to thereby locate the protection where it is most needed.

SUMMARY OF THE INVENTION

The rupture protection ring according to the invention is characterized in that two flexurally stiff supporting rings which are axially spaced apart to form ring edges, a plurality of fiber cloth layers jointly wrapped around said stiff supporting rings, a resin impregnation in said fiber cloth where it is wrapped around said stiff supporting rings, said fiber cloth (4) having fiber orientations which include intermediate angles within the range of about 15° to about 45° between fibers extending in one direction in one layer and fibers slanted in another direction in a different layer at said intermediate angles relative to said one direction, in different layers of said fiber cloth (4a, b, c), and wherein said fiber cloth is free of resin in an area between said stiff supporting rings (2a, 2b).

The advantages of the present invention are seen in that exposure of the fibers to shear stresses in the endangered area between the supporting rings is substantially eliminated by fiber cloth layers wrapped around the supporting rings, wherein the fibers are not fixed by resin laminates. Hence, impinging fragments cannot cause the shear stresses unfavorable to the fibers. This permits optimum exploitation of the high strength of the fibers. By wrapping the supporting rings, and by orienting the fiber cloth layers at differing angles as mentioned above, a favorable transfer of forces into the supporting rings is achieved. The rings provide some sort of frame action, whereby any radial deformation of an annular zone applies tensile stress to all of the fiber strands in the zone, regardless of their fiber orientation. As a result, considerably more fibers and a larger fiber volume are participating in the energy transformation process than is the case with conventional arrangements by substantially omitting the resin matrix material between the rings, the weight of the ring can accordingly be reduced substantially. Further, depending on the rigidity of the supporting rings, the radially directed deformation of the rupture protection means or fibers is reduced, so that the protection is also available to any shock-sensitive engine parts near the casing. The failure probability of the structure by, e.g. due to delamination in the edge zones, is increased. The stiffening of the edge will advantageously also prevent separated parts from slipping over the stiffened edge.

The nonlaminated cloth layers between the edge rings reduce the impact load in a direction transverse to the fibers, whereby simultaneously the proportion of mainly tensile loaded cloth fibers increases to boost the absorption of energy over that commonly associated with laminated structures. This feature eliminates the need for buffer layers, such as sandwich honeycomb structures, for absorbing impact energy, whereby again a weight reduction is achieved.

A substantial advantage afforded by the arrangement in accordance with the present invention is also seen in that due to its high tangential velocity content a blade fragment penetrating the turbine casing, after having been halted by the elastic rupture protection ring, will not be forced back into the rotor area through the hole it pierced through the casing on its way out. Thus, damage to other blades is prevented since the fragment, once out of the casing, remains trapped in a location circumferentially offset from the hole it pierced. The two supporting rings will then prevent the fragment from slipping out laterally.

In a further advantageous aspect of the present invention each supporting ring is made of a foam core circumferentially wrapped by resin-impregnated fiber material. This feature gives the rings a high hoop strength at minimum weight. The fiber material of the supporting rings preferably has a high modulus of elasticity to again boost the stiffness of the rings. The stiffness of the individual supporting ring can be selected within a wide range by using a suitable modulus of elasticity or by the number of windings making up each ring.

The supporting rings can alternatively be hollow sections. Apart from fiber-reinforced plastic materials for the stiff lateral supporting rings, suitable other materials for the rings would be light metals, such as titanium, aluminum or alloys thereof. The supporting rings preferably are rectangular in section to provide an excellent stiffness in the engine axial direction and in the radial direction, thereby keeping the radial expansion of the ring at a moderate level.

The fiber cloth is preferably made of a number of rectangular ribbons of fiber cloth sewn together. The layers of fiber cloth preferably formed by winding fiber cloth around the support cores to form three layers such that the edges of the cloth are in the supporting ring areas. The fiber cloth has a width corresponding to about three times the axial length of the rupture protection ring. Laminating the layers of cloth in the supporting ring areas provides good fixation of the fiber cloth edges between doubled layers for good transfer of forces from the stressed fibers to both supporting rings.

In one embodiment the layers of fiber cloth are bonded together in some areas with an elastic adhesive; this enables spot-joining the layers by an economical process.

The load capacity of the rupture protection ring is especially high when use is made of aramid fibers, such as fibers known by their commercial name of Kevlar 29 or Kevlar 49.

In a further advantageous embodiment of the present invention the layers of fiber cloth are impregnated with resin in the supporting ring areas, whereby a good bond between the fibers and the supporting rings is assured including an adequate fixation of the edges of the fiber cloth ribbons. Additionally, the resin bond of the fibers to the rings adds stiffness to the supporting rings. An advantage achieved especially over FR-PS 2,514,823, is that the stiffening ring is formed by the laminate, which eliminates the need for a separate supporting ring and so again economizes weight.

In a further advantageous embodiment of the present invention the radially outer layers of cloth are stiffened with a resin matrix, whereby the entire rupture protection ring is stiffened without impregnating all the fiber layers with a resin matrix. This feature also prevents warping or sliding of the supporting rings under the impact of fragments. The stiffening effect can alternatively or additionally be achieved by circumferentially wrapping resin-impreganted fiber strands externally over the not impregnated layers of fiber cloth.

By slanting the fibers in different layers of fiber cloth as taught herein so that the angle between the fiber orientations of different layers of fiber cloth is within the angular range of about 15° to about 45°, preferably 30°, many fibers are simultaneously exposed to the load, whereby the length of stressed fibers and thus the maximum absorption of energy is increased due to the large fiber volume involved in the deformation. This intermediate angle can be obtained by offsetting successive layers of fiber cloth by the required angle relative to one another when depositing these layers. For greater strength the intermediate angle should be 15°, while in less critical cases it can be a wider angle, such as 45°, to simplify manufacture. The angle of 30° is quite suitable for many applications.

In a further aspect of the present invention stop means are provided for preventing the supporting cores of the stiff supporting end rings from moving closer together axially. This feature precludes an excessive expansion of the fibers when the supporting rings tend to move closer together under the impact of a fragment. These stop means are preferably provided in the shape of annular flanges fitted to the engine casing next to the end rings.

In further developement of the present invention ceramic plates of annular section or ring sectors are provided between the various layers of fiber cloth. These ceramic rings further reduce local expansion of the rupture protection ring in especially endangered areas or in the presence of sensitive components in close proximity to the engine. For this purpose, the ceramic plates or ring sections may cover the entire circumference or be provided at one or several circumferential locations.

In a further aspect of the invention the stiff supporting end rings have differing diameters, whereby the rupture protection ring has a conical shape. In this arrangement the kinetic energy of the fragments is not fully absorbed by the rupture protection ring. Rather, the inclined position of the rupture protection wall causes the impinging fragment to be deflected in a direction not threatening to damage engine components by a reflector or deflector action. This arrangement is sure to absorb large quantities of energy even when the structure is damaged, and this augments the safety margin against penetration of several fragments when impinging in the same place. Another advantage provided is that the weight of the rupture protection ring can be reduced. It is especially in the second compressor stage area of gas turbine engines that this conical arrangement can be used due to the favorable geometric conditions prevailing in that area.

BRIEF DESCRIPTION OF THE DRAWINGS

In order that the invention may be clearly understood, it will now be described, by way of example, with reference to the accompanying drawings, wherein:

FIG. 2 is a schematic arrangement illustrating the fiber orientations; and

FIG. 4 is a perspective view for explaining how the present protection ring is made;

FIG. 5 is a simplified sectional view showing the completion of the folding of the first, innermost fiber cloth sheet;

FIG. 6 shows schematically the completion of the folding of three fiber cloth sheets; and FIG. 7 is a perspective partially broken away view illustrating the winding of reinforcing rings.

DETAILED DESCRIPTION OF PREFERRED EXAMPLE EMBODIMENTS AND OF THE BEST MODE OF THE INVENTION

Figure 1:
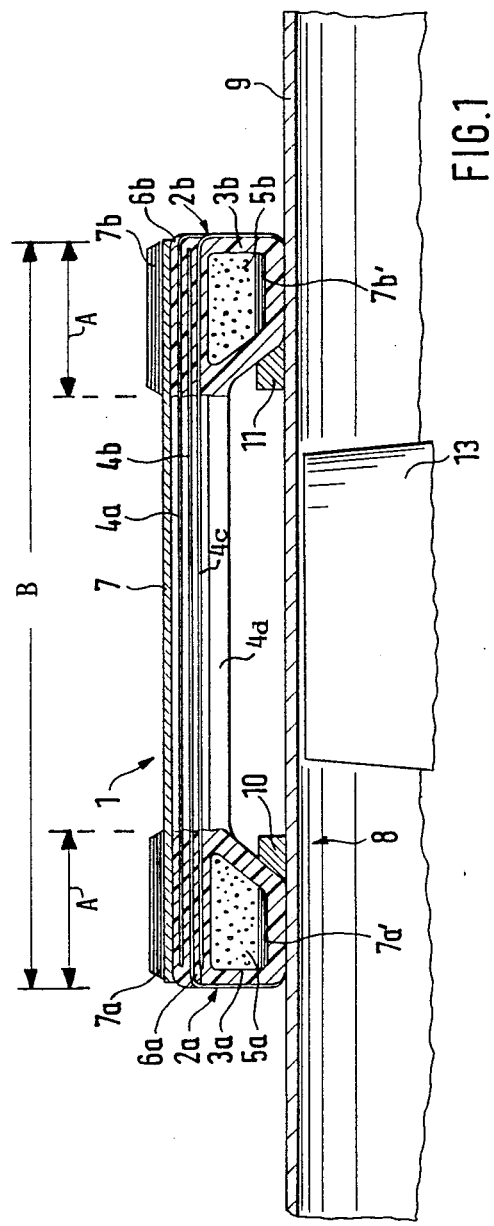
FIG. 1 is a cross-sectional view through one embodiment of a rupture protection ring of the present invention, showing only one portion of the ring.

FIG. 1 is a cross-sectional view of a rupture protection ring 1 with two, axially spaced-apart stiff supporting end rings 2a and 2b surrounding an engine casing 9 in the area of rotor blades 13 so that the supporting rings 2a, 2b are situated to either side axially of the casing section endangered by blade fracture.

The supporting end rings 2a, 2b are made of foam cores 5a, 5b wrapped in resin-impregnated fiber material 3a, 3b. The wrapping; of the fiber material will be explained in more detail below. The supporting end rings 2a, 2b are interconnected by layers of fiber cloth 4a, 4b, 4c, whereby the fiber cloth forms a multiply radially inner lamination 4d. Only one full wrapping 4b, 4c, 4d of fiber cloth and the beginning of the next wrapping are shown in FIG. 1. However, normally several such wrappings, e.g. between fifteen and thirty sheets, will be used whereby the outer wrappings envelope the inner wrappings. These wrappings 4 are so formed that fiber cloth edges 6a, 6b will be bonded to the end rings 2a, 2b by the resin matrix material.

As indicated by arrows A, the fiber material is embedded in the resin matrix only in the areas of the supporting rings 2a, 2b, but not in the area between these supporting rings 2a, 2b. By superimposing several sheets of fiber cloth as mentioned above, one over the other, a dense packing of layers 4a, 4b, 4c, 4d is achieved. The number of all the layers corresponds to three times the number of wrappings.

At its outer circumference the rupture protection ring 1 is provided with a circumferentially wound laminate 7 for protection, stabilization, and reinforcement. Optionally, this laminate can be provided only in the area of the supporting rings 2a, 2b as shown at 7a and 7b to keep the area between the supporting rings 2a, 2b elastic.

Means 8 are provided between the rupture protection ring 1 and the engine casing 9 for preventing the supporting rings 2a, 2b from axially sliding toward each other. In the version shown the means 8 comprise two annular flange type rings 10 and 11 connected to the engine casing 9. The outside diameter of these rings 10, 11 is larger than the inside diameter of the wrapped supporting rings 2a, 2b to provide the required blocking action. For this purpose the rings 10, 11 are rigidly secured to the casing 9 and have stop surfaces engaging the respective ring 10, 11. The stop surface may be slanted as shown.

Shown schematically in FIG. 2 are the various optional angles of fiber orientation. The angle alpha between the various fiber orientations may be in the range of 15° to 45°, preferable 30°. This angular fiber orientation is achieved by superimposing several layers of fiber cloth 4a, 4b, 4c so that the fibers in one layer slant at the desired angle relative to the fiber orientation in the next or neighboring fiber layer. FIG. 2 shows a plurality of such layers superposed one on the other. The protection ring 1 has a width B but the individual fiber sheets have a width about three times the width B to permit the wrapping. The wrapping to be explained in more detail below.

Figure 3:
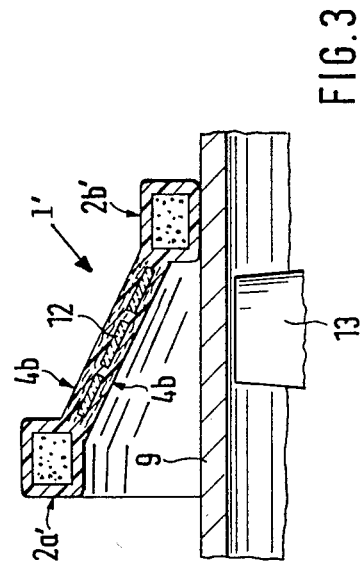
FIG. 3 is a sectional view illustrating a conical version of the rupture protection ring of the invention.

FIG. 3 shows an embodiment wherein the rupture protection ring 1' has a conical shaped, wherein the supporting ring 2a" has a larger diameter than supporting ring 2b'. Annular-section ceramic plates 12 are embedded between the various layers of fiber cloth 4a, 4b. The supporting rings 2a', 2b' are metallic hollow sections of approximately rectangular cross-sections.

Incidentally, in FIG. 1 the foam ring cores 5 1, 5b are reinforced by inserting into these foam rings prefabricated fiber rings 7a',7b' of fiber rovings which are also resin impregnated. The prefabricated fiber rings 7 a', 7b' are inserted into the foam rings 2 a, 2b prior to any wrapping operation.

The wrapping operation will now be described with reference to FIGS. 4, 5, and 6.

FIG. 4 shows, for example, three sheets 20, 30 and 40 of fiber cloth ready to be wrapped around the foam rings 5a and 5b. Sheet 20 has resin impregnated end portions 21 and 22 and an intermediate portion 23 free of resin. The end portions are being folded inwardly as shown by arrows 24, 25. FIG. 5 shows the completion of the wrapping of the innermost sheet 20 with the ends 21 and 22 forming a lapjoint and with the edges 21' and 22' bonded to the foam rings 5a, 5b by the resin not shown in FIG. 5 so as to clearly illustrate the overlapping.

When the first wrapping 20, 21, 22, 23 is completed, the next wrapping is formed in the same manner until the desired number of wrappings are formed. FIG. 5 shows an additional sheet 50 with its end portions 51, 52. In practice fifteen to about thirty sheets may be used. The resin bonding also takes place at the slanted flanks 5a' and 5b' of the foam rings 5a and 5b, but not outside of these foam rings so that the intermediate section 60 shown in FIG. 7 will have a substantial number of tightly packed fiber cloth layers free of resin.

FIG. 6 shows schematically three sheets after wrapping. It does not matter which sheet end portion 21, 22 and so forth is folded over first as long as an alternate overlap is assured. FIG. 7 further shows the formation of the reinforcing rings 7a, 7b by winding fiber threads or roving 70 impregnated with resin onto the end rings 2a, 2b after the above described wrapping operation has been completed.

Although the invention has been described with reference to specific example embodiments, it will be appreciated, that it is intended to cover all modifications and equivalents within the scope of the appended claims.

What I claim is:

1. A rupture protection ring for an engine casing, comprising a structure made at least partially of fiber compound materials, said structure including two flexurally stiff supporting end rings which are axially spaced apart to form ring edges, a plurality of fiber cloth layers jointly wrapped around said stiff supporting rings, a resin impregnation in said fiber cloth where it is wrapped around said stiff supporting end rings, said fiber cloth being free of resin in an area between stiff supporting end rings (2a, 2b), said fiber cloth (4) having fiber orientations which include angles within the range of about 15° to about 45° between fibers extending in one direction in one layer and fibers slanted in another direction in a different layer relative to said one direction.

2. The rupture protection ring of claim 1, wherein each of said stiff supporting end rings (2a, 2b) comprises a foam core (5a, 5b) and a circumferential wrapping of resin-impregnated fiber material (3a, 3b) around each stiff supporting end ring.

3. The rupture protection ring of claim 2, wherein said fiber material of said stiff supporting end rings (2a, 2b) has a high modulus of elasticity.

4. The rupture protection ring of claim 1, wherein said stiff supporting end rings are hollow sections.

5. The rupture protection ring of claim 1, wherein said stiff supporting rings end rings have an approximately rectangular crosssection.

6. The rupture protection ring of claim 1, wherein said fiber cloth (4) comprises a number of fiber cloth ribbons sewn together.

7. The rupture protection ring of claim 1, wherein said fiber cloth (4) has an axial width corresponding to about three times a width of said rupture protection ring (1), said fiber cloth being wrapped around said stiff supporting rings (2a, 2b) to form at least three layers of fiber cloth (4a, 4b, 4c), said fiber cloth layers having edges (6a, 6b) located in an area of said stiff supporting end rings (2a, 2b).

8. The rupture protection ring of claim 1, wherein said fiber cloth layers (4a, 4b, 4c) are spot-bonded to one another by an elastic adhesive intermediate said end rings.

9. The rupture protection ring of claim 1, wherein said fiber cloth layers (4a, 4b, 4c) are made of aramid fibers.

10. The rupture protection ring of claim 1, wherein radially outermost fiber cloth layers (4a) are resin impregnated.

11. The rupture protection ring of claim 1, further comprising resin impregnated fiber strands externally wound circumferentially around said layers of fiber cloth (4a, 4b, 4c).

12. The rupture protection ring of claim 1, further comprising stop means (8) for preventing an axial slipping of said stiff supporting rings (2a, 2b).

13. The rupture protection ring of claim 12, wherein said stop means (18) comprise annular flanges (10, 11) fitted to said engine casing (9) in a rigid manner.

14. The rupture protection ring of claim 1, further comprising ceramic plates (12) formed as annular sectors arranged between said fiber cloth layers (4a, 4b, 4c).

15. The rupture protection ring of claim 1, wherein said stiff supporting end rings have different diameters, whereby said rupture protection ring (1) has a conical shape.

* * * * *